Dec. 28, 1965  J. A. SMYSER ETAL  3,225,661
ROTARY FLUID MOTORS

Filed March 10, 1964  2 Sheets-Sheet 1

JAMES A. SMYSER
EDGAR T. SMYSER
CLIFFORD E. SMYSER
INVENTORS

Huebner & Worrel
ATTORNEYS

United States Patent Office 3,225,661
Patented Dec. 28, 1965

3,225,661
ROTARY FLUID MOTORS
James A. Smyser and Edgar T. Smyser, Bakersfield, and Clifford E. Smyser, Northridge, Calif., assignors to Smyser Fluid Motors, Bakersfield, Calif., a partnership
Filed Mar. 10, 1964, Ser. No. 350,716
10 Claims. (Cl. 91—149)

This invention relates to rotary fluid motors and more particularly to improvements relating to the fluid-metering type thereof giving rise to increased reliability of performance and economy of manufacture and maintenance, while providing rotary fluid compartments capable of passing quantities of fluid even when containing debris in predetermined volumes allowing accurate measurement thereof.

This application represents an improvement stemming from the principles embodied in prior patents granted to E. D. Smyser involving flow motors of the fluid flow metering type. Representative of these patents are U.S. Patents Nos. 2,738,775, 2,853,978, and 2,882,868 granted March 20, 1956, September 30, 1958, and April 21, 1959, respectively. In general, the flow motors described in these patents include a housing enclosing a chamber having a cylindrical wall with a bridge extended along the wall inside the chamber between an inlet and an outlet port. A rotor is mounted in the chamber having pivotal blades movable inwardly and outwardly and dividing the chamber into fluid-tight compartments when in their outer positions.

During operation of this form of device, the fluid enters the inlet port under pressure and is deflected by the bridge member toward the unbridged portion of the chamber striking the blades of the rotor rotating the rotor and allowing the fluid to pass through the unbridged portion until reaching the outlet port for discharge. Although small quantities of fluid continue past the outlet port for a complete encirclement of the chamber, the amounts so doing remain substantially constant for a particular flow rate without affecting the overall accuracy of flow measurement. Various means are provided on the rotor as well as on the chamber wall for preventing the inflowing fluid from passing counter-rotationally through the chamber passage in which the bridge is disposed. Although such devices have proved highly effective in allowing the accurate measurement of fluid flow, even in the case of fluids containing a substantial amount of sand or gravel, the peculiar constrictive nature of the bridge tends to increase engineering difficulties and requires a more complex structure. Further, if operated dry for any significant period, the blades of the rotor hammer as they traverse the bridge with consequent excessive wear and structural deterioration. Therefore, although it is quite clear that this structure represents an advancement over previously known meters, further significant improvements are considered possible and desirable.

Therefore, it is an object of the present invention to provide an improved fluid motor of the fluid flow metering type.

Another object is to provide a fluid motor of the metering type which avoids bridges of the character described and the problems incident thereto.

Another object is to provide a fluid meter having a fluid metering chamber providing minimum obstruction to fluid passage.

Another object is to provide a fluid meter having a coacting housing and rotor in which the housing presents a cylindrical internal surface for rotor engagement.

Another object is to provide a fluid meter of simplified construction.

Another object is to minimize vibration in fluid meters.

Another object is to provide a fluid meter having a coacting housing and rotor which is self-cleaning.

Other objects are to provide a fluid flow motor which is adapted to pass fluid-borne impurities, such as sand and the like, without damage thereto and without appreciable metering errors, which is simple in construction, durable in structure, speedily and economically produced and maintained, dependable in operation, and highly effective in accomplishing its intended purposes.

These and other objects will become more fully apparent upon reference to the subsequent description in the specification.

Referring more particularly to the drawings, the fluid motor of the present invention consists in general of a body member 10 providing a cylindrical housing 11 in which is mounted a rotor 12.

Figure 1:
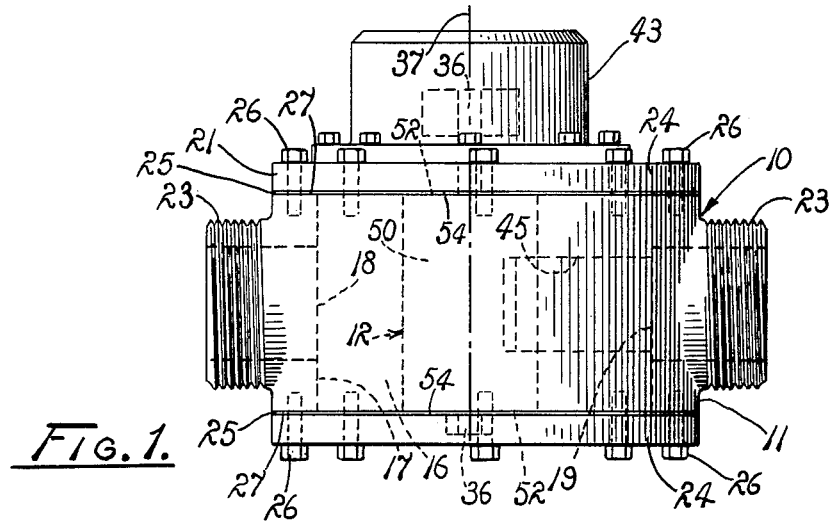
FIG. 1 is a side elevation of a fluid motor embodying the principles of the present invention.
Figure 2:
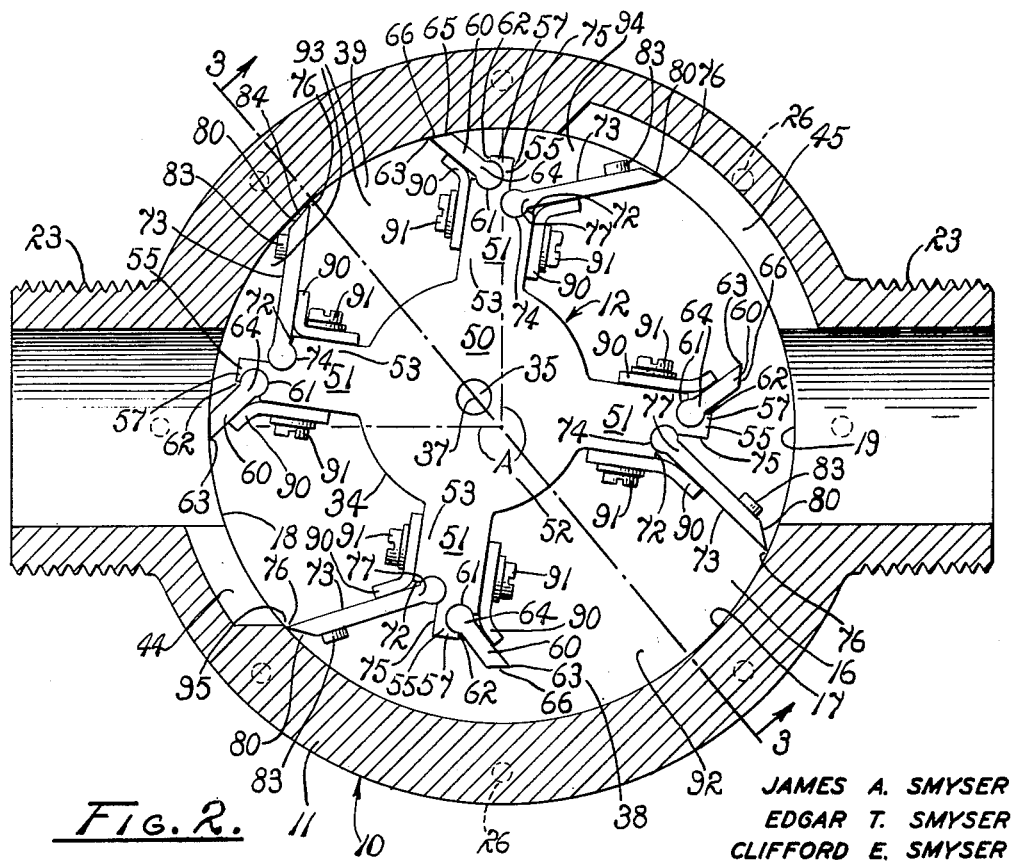
FIG. 2 is an enlarged longitudinal section taken along line 2—2 in FIG. 1.
Figure 3:
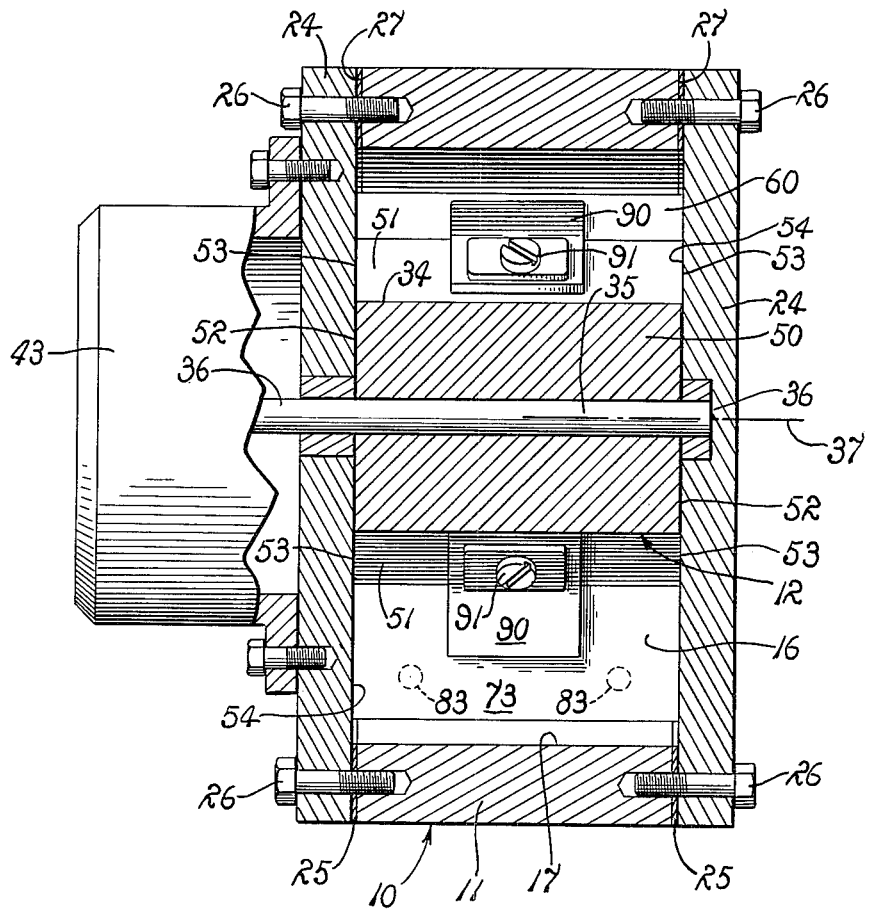
FIG. 3 is an enlarged transverse section taken along line 3—3 in FIG. 2.

The housing 11 encloses an internal chamber 16 having a substantially cylindrical side wall 17 and respective inlet and outlet ports 18 and 19 which, in the illustrative embodiment are diametrically aligned but which need not be so if design considerations require other relationships. The ports respectively open through a pair of externally threaded male nipples or fittings 23. End covers 24, preferably having sheets 25 of resiliently flexible and compressible material internally thereof, are secured by means of bolts 26 to the opposite annular ends 27 of the side wall in covering relation to the chamber and the opposite annular ends of the wall. The chamber occupies four spacial quadrants, one of which is shown, for example, at 29 in FIG. 2.

The rotor 12 is mounted eccentrically in the chamber 16 for rotation in a predetermined direction (counterclockwise in the structural form shown in FIG. 2 of the drawings) about an axle 35. The axle provides opposite ends 36 which are seated for rotation in the respective opposite end covers 24 of the housing 11 so that the axis of rotation 37 is disposed in the quadrant of the chamber which is situated contiguous to the inlet port 18 and extended therefrom in the direction opposite to the direction of rotation of the rotor as shown at A in FIG. 2. By thus positioning the rotor, the fluid passageway available for fluid flow through the motor is expanded at 38 in FIG. 2, as compared with concentric disposition of the axis, allowing flow of a larger quantity of fluid therethrough. In contrast, the opposite passageway 39 is correspondingly diminished in size, thus decreasing the tendency of the fluid entering the inlet port to proceed in this direction impeding the rotation of the rotor and causing undesirable obstruction of flow through the device. This eccentric positioning of the rotor serves the same purpose as E. D. Smyser's bridge member, mentioned above, and permits certain simplification.

One end of the axle 35 may be extended for connection to an indicator, as shown at 43, suitably mounted on the outer face of the corresponding end cover 24. The indicator is not described in detail since any suitable form may be utilized, allowing visual determination of the various flow properties.

Contiguous with the ports 18 and 19 and communicating respectively therewith are separate cavities 44 and 45 situated in the side wall 17. The cavities extend circumferentially of the chamber a predetermined distance in the direction of rotation of the rotor 12.

The rotor 12 consists of a body 50 mounted concentrically on the axle 35 and having a peripheral surface 34. Extending radially from the body axially coterminous therewith are a plurality of circumferentially equally spaced integral arms 51. The respective axial end surfaces 52 and 53 of the central body and the arms are mutually coplanar, lying substantially flush with the inner surfaces 54 of the end covers 24. Although various configurations may be utilized for the rotor arms, the preferred configuration is depicted in the drawings, as shown at 51 in FIG. 2, which shows the outer end portions 55 of the arms in a radially stepped arrangement. The outermost step 57 of each arm is disposed on the portion of the segment facing the direction of rotation of the rotor.

An elongated blade 60, preferably formed of a suitable durable plastomeric material, is fastened to each outer step 57 by means of a hinge 61 along its inner elongated portion 64 effecting a fluid-sealing pivotal engagement therebetween. The hinge provides a stop 62 limiting the blade to pivotal positions disposed forwardly of the direction of rotation of the rotor. The transverse extent of this blade is such that during rotation of the rotor the free edges 63 of the blade come into contact with the side wall 17 of the chamber 16 only while passing that portion of the wall situated adjacent to the inlet port 18 in the direction opposite to the direction of rotor rotation, as is generally shown at 65 in FIG. 2. The free end of this blade is preferably beveled on its rearward free edge, as at 66, so as to provide an outwardly oriented contact face suitable for fluid-sealing sliding engagement with the side wall. In order to prevent excessive wear on its bearing edge this blade may be concavo-convex, so as to decrease its angle of contact with the wall and minimize its bearing pressure.

An elongated transversely extended blade 73 is mounted on each of the inner steps 72 of the rotor arms and has an inner elongated portion 77 attached to the step by means of a hinge 74. The hinge provides a stop 75 restricting the pivotal movement of its blade to positions disposed rearwardly of the direction of rotation of the rotor. As with the forward blade 60, the transversely extended blade is formed of a suitable plastomeric material and is attached to the rotor arm in fluid-sealing engagement therewith. The transversely extended blades are adapted to swing outwardly so that their free edges 76 may continuously engage the side wall 17 of the chamber during rotation. The forward edges of the blades are preferably beveled, as at 80, so as to provide outwardly oriented contact surfaces suitable for fluid-sealing sliding engagement with the side wall.

Protuberances or beads 83 are cast integrally on the forward face of each transversely extended blade 73 projecting from the surface of the face so as to withhold the free edge of the blade in spaced relation with the side wall, as at 84, while the blade is rotating between the outlet cavity 45 and the inlet port 18.

Rectangular-shaped elements 90 of resiliently flexible material are mounted on the opposite sides of each rotor arm 51 in perpendicular overlapping relation respectively with the adjacent blades 60 or 73. They lie substantially flat when relaxed and have their inner ends connected to the rotor arms, as at 91, with their outer ends radially extended for contact with the corresponding blade. These elements serve to urge the blades outwardly into sliding engagement with the side wall 17.

*Operation*

The operation of the described embodiment of the subject invention is believed to be readily apparent and is briefly summarized at this point. During operation of the motor, the fluid enters the inlet port 18 under pressure seeking a passageway through the chamber 16. Due to the sealing effect of the blades 60 and 73 when bearing against the wall 17 the fluid cannot pass unless the rotor is rotating. Accordingly, the fluid exerts pressure on the surfaces of the rotor 12, the rotor arms 51 and the blades bearing against the wall adjacent to the inlet, causing a resultant turning movement, acting counterclockwise as viewed in FIG. 2. This arises from the eccentric mounting of the rotor in the chamber. Due to this eccentricity the surface areas exposed to the fluid pressure in the enlarged passageway 38 are greater than those in the opposite smaller passageway 39, with the result that the counter-clockwise force is greater than the clockwise force. Likewise, its moment arm is longer. Therefore, rotational movement is imparted to the rotor in a counterclockwise direction, as viewed in FIG. 2. The inlet port may be varied as desired to provide supplemental surfaces for further deflecting the entering fluid toward the expanded passageway.

During rotation the compartments 92 undergo an expansion each time they are propelled into the enlarged passageway 38. After they have passed the inlet port and have become fluid-tight, their continued expansion tends to result in sudden pressure drops which could lead to undesirable vacuumatic conditions if not abated. In order to prevent this occurrence, with its resultant detriment to efficient and accurate metering, the inlet cavity 44 is extended in the direction of rotation to a position 95 situated a sufficient distance from the inlet port 18 to provide relief to the rotating compartments experiencing low-pressure conditions. Each compartment is allowed a brief interlude of fluid-tight fluid constrainment before passing on to the outlet port. The result is a more constant and efficient distribution of the flowing fluid, without the drawback of erratic low-pressure conditions.

During this rotation, the propelling blades 73 are continually urged outwardly by the resilient elements 90. Due to the cylindrical nature of the side wall 17 these propelling blades are held in contact with the wall continually throughout the complete rotational cycle of the rotor without experiencing the operational difficulties inherent in similar devices which contain a bridge element along the chamber wall interrupting the cylindrical regularity.

As each propelling blade 73 passes the end 95 of the inlet cavity 44, the flowing fluid is contained in a substantially fluid-tight compartment 92 formed by two adjacent propelling blades. This serves to pass a certain definite quantity of fluid in each successive rotational transfer. Such a feature leads to greater accuracy in the metering of volume flow, since the flow passing through the motor is substantially constant at each rotational speed of rotor. Regularity of return flow in diminished passageway 39 is also enhanced, due to the periodic formation of rotary compartments 93 between adjacent blades 60, and smaller compartments 94 defined by pairs of blades 60 and 73, as well as the compartments 92. As a result of such segmented flow compartments, the rotating rotor 12 tends to maintain a more steady speed and more accurately to reflect the net flow through the device than in devices having neither a return passageway nor a continuous series of compartments.

During operation under pressure, it will be evident that the chamber 16 is filled with fluid. Consequently, fluid is carried in the rotational cycle from the outlet port back to the inlet port and is prone to cause excessive pressures in the diminished passageway 39 with resultant inefficient over-all operation of the motor. Such pressures tend to occur in the main compartments 92 and in the smaller compartments 94. In order to prevent this occurrence in the main compartments, an elongated cavity 45 is provided in the wall 17 contiguous with the outlet port. This cavity extends in the direction of rotation and provides a discharge passageway for fluid remaining in the main compartments after passing the outlet port, allowing it to exit as necessary to avoid excessive pressures. The extended end of the cavity is disposed so that the circumferential distance between it and the inlet port is less than the distance between two adjacent propelling blades 73, representing the circumferential length of one compartment. Excessive pressure in the small compartment 94 is prevented by the protuberances 83 in the forward faces of the propelling blades, which maintain their respective blades in spaced relation with the wall, as at 84, during each movement from the outlet port back to the inlet port allowing escape of fluid as necessary from the smaller compartments.

As each compartment passes the outlet port 19 and proceeds through the diminished passageway 39 towards the inlet port 18, its respective forwardly pivoting blade 60 comes into substantially fluid-tight sliding engagement with the side wall 17. This serves to prevent fluid entering the inlet port from proceeding in a counter flow through the diminished passageway and impairing the operation of the motor. After passing the inlet port, these forwardly pivoting blades serve no substantial purpose until they have again traversed the outlet port and have returned a substantial part of the distance from the outlet port to the inlet port.

Thus, it can be seen that the present invention provides an improved fluid motor of the fluid flow metering type, having a simplified structural design contributing to a more efficient fluid metering. Furthermore, the motor provides greater durability and ease of manufacture and maintenance. The hammering which occurs in previously known motors of the fluid metering type when run dry has been successfully obviated.

Although the invention has been hereinshown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a fluid motor, the combination of a body member having an internal chamber defined by a substantially cylindrical side wall circumscribing a central axis, and inlet and outlet ports having respective centers spaced circumferentially of the chamber adapted respectively to receive and to discharge flowing fluid, said cylindrical chamber spacially occupying four quadrants centered about the central axis of said chamber having a common coordinate plane passing through the center of said inlet port; a rotor mounted eccentrically in the chamber for rotation in a predetermined direction about an axis disposed in a quadrant of said chamber situated contiguous to the center of said inlet port and extending therefrom in the direction opposite to the direction of rotation of the rotor, said rotor having a peripheral surface in spaced relation with said wall, said side wall providing elongated cavities respectively contiguous to each of said ports communicating therewith and extending circumferentially of the chamber in the direction of rotation of the rotor from their respective ports; fluid-sealing blade means mounted on the peripheral surface of said rotor adapted freely to pivot rearwardly of the direction of rotation of the rotor, yieldably engaging the side wall of the chamber in all positions of the rotors to form substantially fluid-tight rotary compartments for constraining the flowing fluid and imparting rotational impetus to said rotor; and fluid-sealing means mounted on the peripheral surface of said rotor proximately forwardly of the pivotal blade means adapted yieldably slidably to engage the wall adjacent to the inlet port in the direction therefrom opposite to the direction of rotation of the rotor and to block fluid flow through the chamber in the direction opposite to the direction of rotation of the rotor.

2. In a fluid motor, the combination of a body member having an internal chamber defined by a substantially cylindrical side wall circumscribing a central axis, and inlet and outlet ports having respective centers spaced circumferentially of the chamber adapted respectively to receive and to discharge flowing fluid, said cylindrical chamber spacially occupying four quadrants centered about the central axis of said chamber having a common coordinate plane passing through the center of the inlet port; a rotor mounted eccentrically in the chamber for rotation in a predetermined direction about an axis disposed in a quadrant of said chamber situated contiguous to the center of said inlet port and extending therefrom in the direction opposite to the direction of rotation of the rotor, said rotor having a plurality of substantially equally circumferentially spaced radially extended arms axially coterminous with said rotor and having outer end portions in spaced relation with said side wall, said side wall providing elongated cavities respectively contiguous to each of said ports communicating therewith and extending circumferentially of the chamber in the direction of rotation of the rotor from their respective ports; fluid-sealing blade means mounted on the respective end portions of said arms adapted freely to pivot rearwardly of the direction of rotation of the rotor yieldably engaging the side wall of the chamber in all positions of the rotor to form substantially fluid-tight rotary compartments for constraining the flowing fluid therein and imparting rotational impetus to said rotor; and fluid-sealing means mounted on the respective end portions of said arms proximately forwardly of the pivotal blade means adapted yieldably slidably to engage the wall adjacent to the inlet port in the direction therefrom opposite to the direction of rotation of the rotor and to block fluid flow through the chamber in the direction opposite to the direction of rotation of the rotor.

3. In a fluid motor, the combination of a body member having a chamber, a substantially cylindrical side wall for the chamber, and spaced inlet and outlet ports in communication with the chamber adapted respectively to receive and to discharge flowing fluid; a rotor mounted eccentrically within the chamber for rotation in a predetermined direction and having a peripheral surface disposed in spaced relation to the side wall, said peripheral surface describing its closest proximity to said side wall adjacent to said inlet port in the direction therefrom opposite to the direction of rotation of the rotor, said side wall providing elongated cavities respectively contiguous to each port communicating therewith and extending circumferentially of the chamber in the direction of rotation of the rotor from their respective ports; a plurality of substantially equally spaced elongated blades having inner elongated portions pivotally connected to the peripheral surface of said rotor in substantially fluid tight relation thereto, said blades being adapted freely resiliently to pivot forwardly of the direction of rotation of the rotor engaging in sliding yieldable contact with said side wall adjacent to the inlet port in the direction therefrom opposite to the direction of rotation of the rotor for blocking fluid flow through the chamber in the direction opposite to the direction of rotation of the rotor; and a plurality of substantially equally spaced elongated transversely extended blades each having an inner elongated portion pivotally connected to the peripheral surface of said rotor rearwardly of the respective forward pivoting blades in substantially fluid-tight relation with said surface, said transversely extended blades being adapted resiliently to pivot freely rearwardly of the direction of rotation of the rotor yieldably to engage in continuous fluid-constraining sliding contact with said side wall.

4. In a fluid motor having a chamber circumscribed by a side wall providing an inlet and an outlet, a rotor mounted in the chamber for rotation, and a plurality of blades mounted in substantially equally spaced relation about the rotor and outwardly extended therefrom in a common direction about the rotor for resilient side wall engagement, the side wall varying in spacing from the rotor at various positions about the rotor and the blades responsively varying in angles of engagement with the side wall as they traverse the same incident to rotor rotation; a device for retracting the blades from the side wall during traversal of the portions thereof most closely adjacent to the rotor comprising protuberances on each of said blades adjacent to the extended ends thereof disposed therefrom toward the side wall engageable with the side wall when their respective blades are most acutely angularly related thereto.

5. In a fluid motor having a chamber circumscribed by a substantially cylindrical side wall providing an inlet and an outlet, a rotor mounted eccentrically in the chamber for rotation in a predetermined direction, and a plurality of elongated blades mounted in substantially equally spaced relation about the rotor and rearwardly extended therefrom for resilient side wall engagement, said elongated blades having progressively varying angles of engagement with the side wall during rotor rotation incident to the eccentric mounting of the rotor with respect to the side wall; a device for retracting the blades from the side wall during traversal of the portions thereof most closely adjacent to the rotor comprising protuberances on each of said blades adjacent to the extended ends thereof disposed therefrom in the direction of rotor rotation engageable with the side wall when their blades are most acutely angularly related thereto.

6. A fluid motor comprising a housing having a chamber circumscribed by a substantially cylindrical side wall through which a port and an outlet are provided; a rotor mounted eccentrically in the chamber for rotation in a predetermined direction, the rotor being in spaced relation to all portions of the side wall; a plurality of elongated blades mounted on the rotor in substantially equally spaced relation thereabout and rearwardly extended relative to the direction of rotor rotation for substantially fluid tight engagement with the side wall, said elongated blades being of sufficient length to engage the side wall throughout its portions of most distant spacing from the rotor and being resiliently urged outwardly into side wall engagement whereby fluid flowing from the inlet port to the outlet port between the rotor and the portions of the side wall of most distant spacing therefrom bears against the elongated blades and turns the rotor; a plurality of shorter blades individually mounted forwardly adjacent to the elongated blades and forwardly extended therefrom relative to direction of rotor rotation, said shorter blades being of insufficient length to engage the portions of the side wall of most distant spacing from the rotor but resiliently urged outwardly for engagement with the more closely adjacent portions of the side wall to preclude fluid flow from the inlet to the outlet between the rotor and the more closely adjacent portions of the side wall, the elongated blades having progressively varying angles of engagement with the side wall during rotor rotation corresponding to extent of rotor spacing from the side wall and said elongated blades with their respective shorter blades tending to trap fluid therebetween during traversal of the more closely adjacent portions of the side wall; and protuberances on each of the elongated blades disposed in the direction of rotor rotation therefrom engageable with the side wall while their respective blades are most acutely angularly related thereto to retract their respective blades from the side wall to release said trapped fluid.

7. In a fluid motor, the combination of a body member having an internal chamber defined by a side wall circumscribing a central axis, and inlet and outlet ports spaced circumferentially of the chamber adapted respectively to receive and to discharge flowing fluid; a rotor mounted in the chamber eccentrically of the axis thereof for rotation in a predetermined direction and having a peripheral surface spaced from said side wall; fluid-sealing blade means mounted on the peripheral surface of said rotor adapted freely to pivot rearwardly of the direction of rotation of the rotor, yieldably engaging the side wall of the chamber in all positions of the rotor to form substantially fluid-tight rotary compartments for constraining the flowing fluid and imparting rotational impetus to said rotor; and fluid-sealing means mounted on the peripheral surface of said rotor proximately forwardly of the pivotal blade means adapted yieldably slidably to engage the wall adjacent to the inlet port in the direction therefrom opposite to the direction of rotation of the rotor and to block fluid flow through the chamber in the direction opposite to the direction of rotation of the rotor.

8. The combination of claim 7 in which the fluid-sealing blade means varies in angular engagement with the side wall during rotation of the rotor and including protuberances on each of said blade means adjacent to the side wall engageable with the side wall when their respective blade means are most acutely angularly related to the side wall to displace their respective blade means from the side wall sufficiently to permit fluid flow therepast.

9. In a fluid motor, the combination of a body member having an internal chamber defined by a side wall circumscribing a chamber, and inlet and outlet ports spaced circumferentially of the chamber; a rotor mounted eccentrically of the chamber for rotation in a predetermined direction having a plurality of substantially equally spaced radially extended arms having outer end portions in spaced relation to said wall; fluid-sealing blade means mounted on the respective end portions of said arms adapted freely to pivot rearwardly of the direction of rotation of the rotor, yieldably engaging the side wall of the chamber in all positions of the rotor to form substantially fluid-tight rotary compartments for constraining the flowing fluid therein and imparting rotational impetus to said rotor; and fluid-sealing means mounted on the respective end portions of said arms proximately forwardly of the pivotal blade means adapted yieldably slidably to engage the wall adjacent to the inlet port in the direction therefrom opposite to the direction of rotation of the rotor and to block fluid flow through the chamber in the direction opposite to the direction of rotation of the rotor.

10. In a fluid motor, the combination of a body member having an internal chamber defined by a side wall circumscribing a central axis, and inlet and outlet ports spaced circumferentially of the chamber adapted respectively to receive and to discharge flowing fluid; a rotor mounted in the chamber eccentrically of the axis thereof for rotation in a predetermined direction and having a peripheral surface spaced from said side wall; a plurailty of substantially equally spaced elongated blades having inner elongated portions pivotally connected to the peripheral surface of said rotor in substantially fluid-tight relation thereto, said blades being adapted freely resiliently to pivot forwardly of the direction of rotation of the rotor engaging in sliding yieldable contact with said side wall adjacent to the inlet port in the direction therefrom opposite to the direction of rotation of the rotor for blocking fluid flow through the chamber in the direction opposite to the direction of rotation of the rotor; and a plurality of substantially equally spaced elongated transversely extended blades each having an inner elongated portion pivotally connected to the peripheral surface of said rotor rearwardly of the respective forward pivoting blades in substantially fluid-tight relation with said surface, said transversely extended blades being adapted resiliently to pivot freely rearwardly of the direction of rotation of the rotor yieldably to engage in continuous fluid-constraining sliding contact with said side wall.

(References on following page)

References Cited by the Examiner

UNITED STATES PATENTS

| | | | |
|---|---|---|---|
| 510,600 | 12/1893 | Hochhausen | 91—142 |
| 801,849 | 10/1905 | Carpenter | 91—142 |
| 1,343,115 | 6/1920 | Current | 91—149 |
| 1,782,314 | 11/1930 | Poirmeur | 103—140 |
| 2,882,868 | 4/1959 | Smyser | 91—149 |

FOREIGN PATENTS 299,381   7/1917   Germany.

SAMUEL LEVINE, *Primary Examiner.*

JOSEPH H. BRANSON, JR., DONLEY J. STOCKING, *Examiners.*

R. M. VARGO. *Assistant Examiner.*